United States Patent [19]
White

[11] Patent Number: 5,090,851
[45] Date of Patent: Feb. 25, 1992

[54] CUTTING TOOL FOR MILLING MACHINES

[76] Inventor: Joseph P. White, 28655 Kimberly, St. Clair Shores, Mich. 48081

[21] Appl. No.: 746,229

[22] Filed: Aug. 15, 1991

[51] Int. Cl.$^5$ ................................................. B23C 1/12
[52] U.S. Cl. .................................... 409/199; 409/201; 409/211
[58] Field of Search ............... 409/143, 199, 201, 206, 409/211, 231

[56] References Cited

U.S. PATENT DOCUMENTS

| | | |
|---|---|---|
| 1,029,402 | 6/1912 | Ritter . |
| 1,040,954 | 10/1912 | Johnson . |
| 1,879,548 | 9/1932 | Sethman ............................. 409/199 |
| 2,134,210 | 10/1938 | Secor .................................. 409/199 |
| 2,963,944 | 12/1960 | Strauss . |
| 3,335,638 | 8/1967 | Brunn . |
| 4,942,657 | 7/1990 | Mihara et al. . |
| 4,993,138 | 2/1991 | Yang . |

FOREIGN PATENT DOCUMENTS 1096051 6/1984 U.S.S.R. ............................. 409/201

Primary Examiner—Daniel W. Howell
Attorney, Agent, or Firm—Peter D. Keefe

[57] ABSTRACT

A milling machine cutter tool structured and oriented to perform complex three dimensional contour machining operations and provides for the cutting edges of the cutter to engage the workpiece in the same direction as the feed direction, thereby resulting in maximal cutting efficiency. The cutting tool is composed of a sleeve rotatably mounted to the milling machine, a quill axially movable in the sleeve, a position drive for selectively moving the quill relative to the sleeve, a drive shaft rotatably supported in the quill and connected at a rear end thereof to a cutter drive, a cutter head connected to the opposite forward end of the quill, a worm gear set mounted in the cutter head connecting gearably to the drive shaft, a cutter shaft mounted in the cutter head transversely in relation to the drive shaft and gearably connected to the worm gear set, and a side cutter connected to the cutter shaft, the side cutter supporting teeth extending forwardly of the cutting head. In one preferred embodiment, the drive shaft is powered by a self-contained drive motor connected to the quill. In a second preferred embodiment, the drive shaft is powered by the spindle drive system of the milling machine.

16 Claims, 5 Drawing Sheets

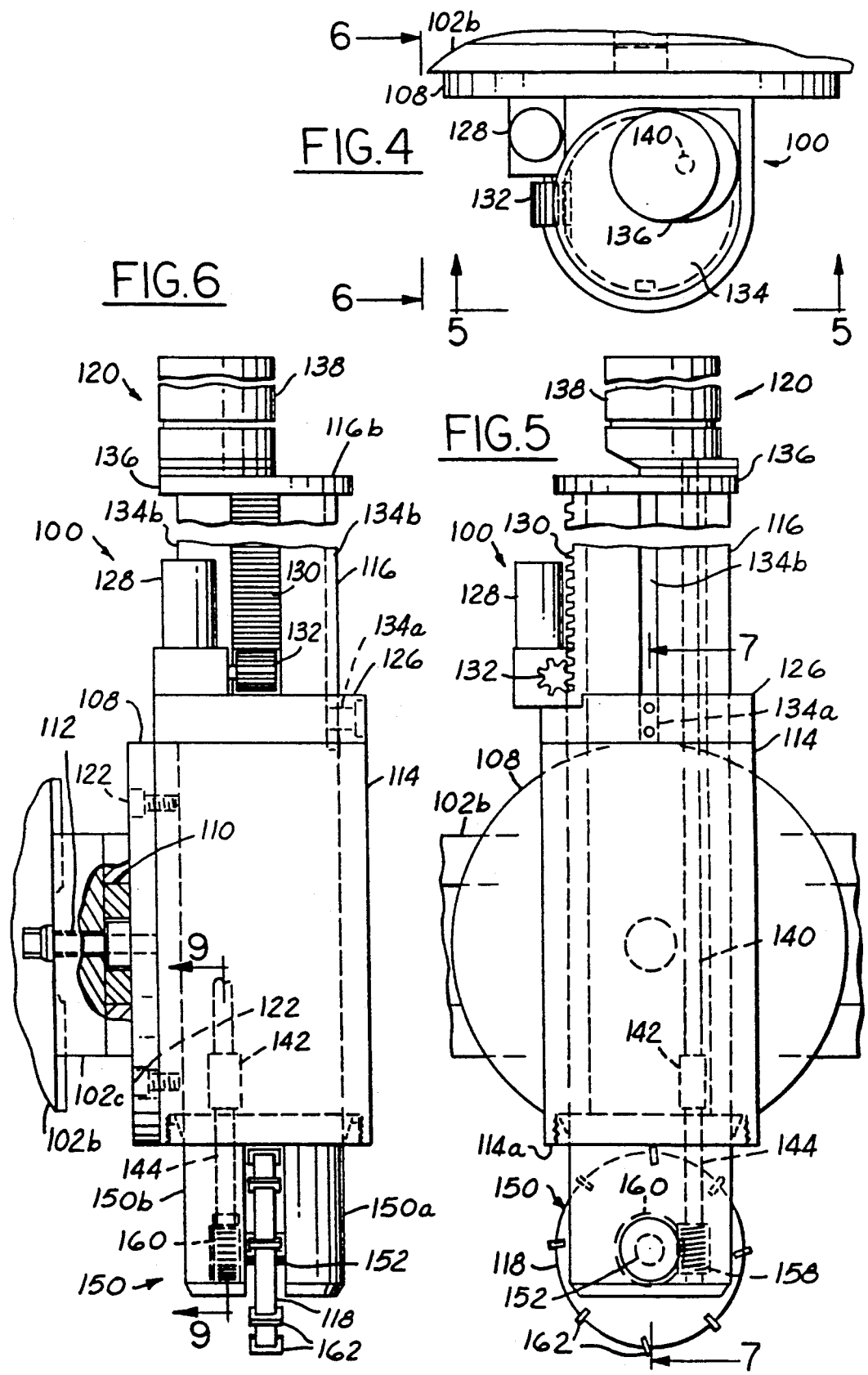

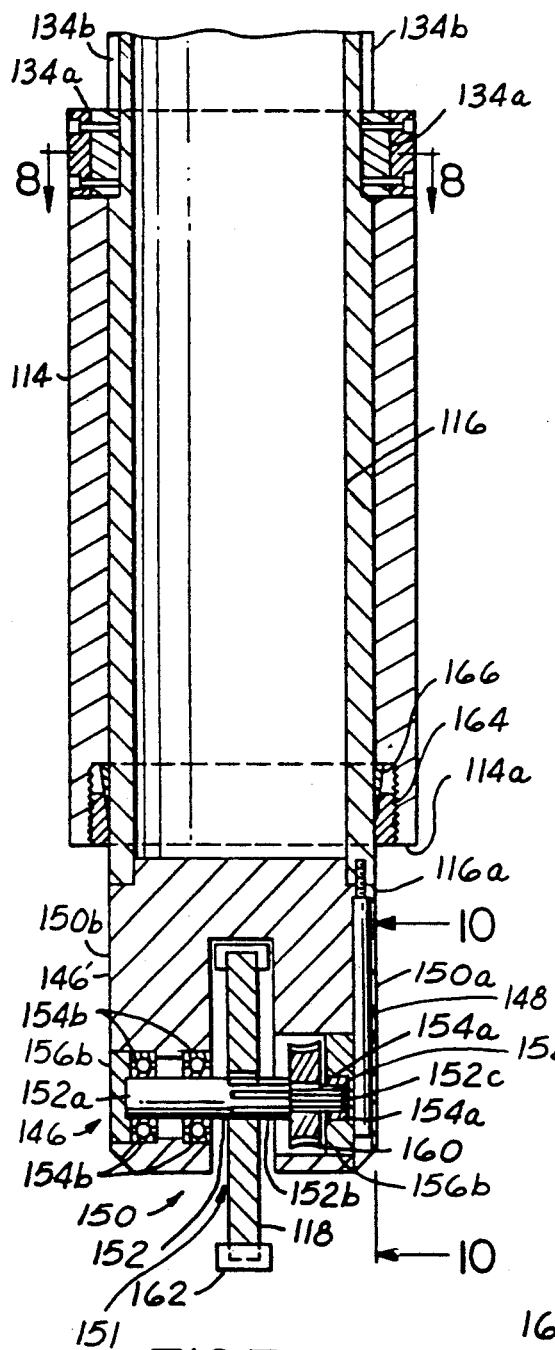
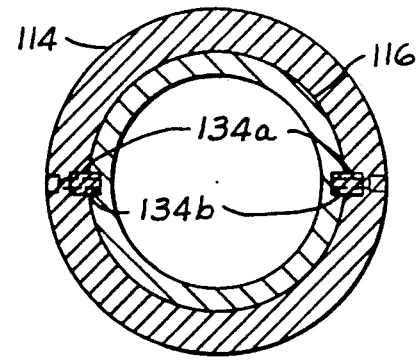
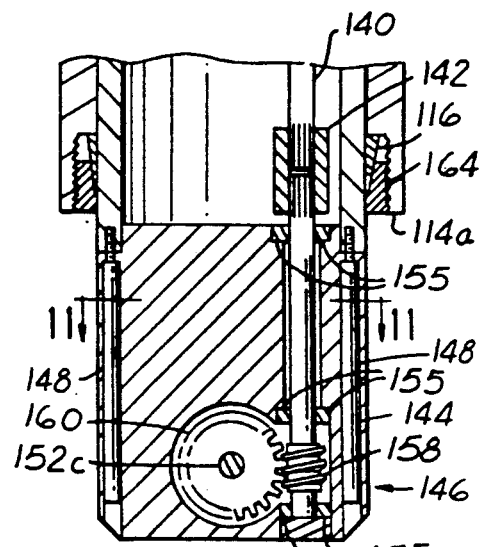
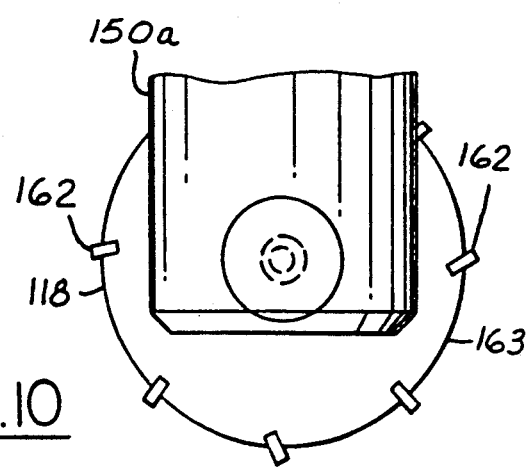

CUTTING TOOL FOR MILLING MACHINES

BACKGROUND OF THE INVENTION

1. Field of the Invention

The present invention relates to cutting tools used on milling machines for machining a workpiece, and particularly to a cutting tool composed of a side cutter oriented transversely to the rotational axis of the milling machine spindle for performing contour machining operations in three dimensions.

2. Description of the Prior Art

Milling machines are in widespread use for machining metal workpieces into a finished metal product. Machining operations of this type range from simple straight cuts and bores to forming complex three dimensional contours. Milling machines are divided into horizontal and vertical types depending on the orientation of the spindle axis. Common to all milling machines is a bed to which is connected a workholder and at least one column for supporting a spindle head. The spindle head contains the spindle and drive for the spindle, and is movable in relation to the workholder. The workpiece is affixed to the workholder and a cutting tool is connected with the spindle. The cutting tool is rotated by the spindle drive and is brought into contact with the workpiece by movement of the spindle head.

In the case of machining contours in three dimensions, typically many passes are made by a cutting tool in a progressive fashion over the area being contoured. FIGS. 1 and 1A show a typical state of the art milling operation in which a spindle 20 turns an end mill cutter 22 which makes a series of groove cuts 24 to form a contour 26 on a workpiece 28. Due to the complexity of the movements of the cutter to achieve the desired contour, use of Computer Numerical Control (CNC) systems are now becoming the standard to control movement of the cutting tool in relation to the workpiece. In CNC, a programmer converts movements of the cutting tool into a digital sequence which is then fed into a computer. The computer is linked electronically to the drives for three dimensional movement of the spindle head and the spindle drive. A computer program converts the digital data into electronic commands that regulate the feed and speed rates.

The milling operation just described suffers from a number of drawbacks. The large number of passes of the end mill cutter results in an extensive amount of time required to complete a contouring operation on a workpiece. Further, the workpiece comes into contact with only a portion of the cutting edge of the end mill cutter as each groove cut is made. This is because the end mill is rotating about an axis which moves laterally with respect to the workpiece. Accordingly, the cutting edge of the end mill does not directly engage the workpiece in the direction of feed, resulting in inefficient cutting. Still further, a second machining operation is required to smooth-out the grooves cuts.

As further examples of milling machines, the following U.S. patents are of interest.

U.S. Pat. No. 1,029,402 to Ritter, dated June 11, 1912, discloses a milling tool attachment for a drill press. Bevel gears connected with the spindle drive a gear set that in turn drives a side cutter oriented perpendicular with respect to the axis of rotation of the spindle. The resulting milling tool attachment has only a vertical axis of movement, and is not suited for use in three dimensional contour milling.

U.S. Pat. No. 1,040,954 to Johnson, dated Oct. 8, 1912, discloses an attachment for milling machines which enables quick change of cutters and supports various forms and shapes of cutters. The attachment is composed of a U-shaped casing for supporting the cutter and associated gearing which permits turning of the cutter in a direction parallel with respect to the spindle of the machine.

U.S. Pat. No. 2,963,944 to Strauss, dated Dec. 13, 1960, discloses a milling machine which may be converted to various orientations of the axis of rotation of the spindle. In this device, the upper portion of the base carries a turret which carries the spindle and its drive. The turret is rotatable and a separately powered vertical head is employed for vertical and angular milling.

U.S. Pat. No. 4,993,138 to Yang, dated Feb. 19, 1991, discloses a milling machine having a grooved overarm horizontally disposed in relation to the machine body. A vertical milling attachment slides along the grooved overarm for horizontal movement.

While the milling machine art is extremely well developed, there yet remains the need for a milling machine cutter tool which is structured and oriented so as to perform complex three dimensional contour machining operations and which further provides for the cutting edges of the cutter to engage the workpiece in the same direction as the feed direction, thereby resulting in maximal cutting efficiency.

SUMMARY OF THE INVENTION

The present invention is a milling machine cutter tool which is structured and oriented so as to perform complex three dimensional contour machining operations and which further provides for the cutting edges of the cutter to engage the workpiece in the same direction as the feed direction, thereby resulting in maximal cutting efficiency.

The cutting tool according to the present invention is composed, inter alia, of a sleeve that is rotatably mounted to the milling machine, a quill axially movable in the sleeve, a position drive for selectively moving the quill relative to the sleeve, a drive shaft rotatably supported in the quill and connected at a forward end thereof to a cutter drive, a cutter head connected to the opposite rear end of the quill, a worm gear set mounted in the cutter head connecting gearably to the drive shaft, a cutter shaft mounted in the cutter head transversely in relation to the drive shaft and gearably connected to the worm gear set, and a side cutter connected to the cutter shaft, the side cutter supporting teeth extending forwardly of the cutting head.

In one preferred embodiment, the drive shaft is powered by a self-contained cutter drive motor connected to the quill. In a second preferred embodiment, the drive shaft is powered by the spindle drive system of the milling machine.

In operation, the axis of rotation of the side cutter is adjusted so that the teeth of the side cutter engage the workpiece in the feed direction. As cuts are made in the workpiece, the milling machine moves the cutting tool vertically and horizontally as required, while the quill is moved in and out with respect to the sleeve as required to cause the teeth of the side cutter to engage the workpiece and thereby provide the desired contour thereon.

Accordingly, it is an object of the present invention to provide a milling machine cutter tool which is structured and oriented so as to perform complex three dimensional contour machining operations and which further provides for the cutting edges of the cutter to engage the workpiece in the same direction as the feed direction, thereby resulting in maximal cutting efficiency.

These, and additional objects, advantages, features and benefits of the present invention will become apparent from the following specification.

BRIEF DESCRIPTION OF THE DRAWINGS

FIG. 4 is a top plan view of the cutting tool according to the present invention seen along lines 4—4 in FIG. 3.

FIG. 5 is a side view of the cutting tool according to the present invention seen along lines 5—5 in FIG. 4.

FIG. 6 is a side view of the cutting tool according to the present invention seen along lines 6—6 in FIG. 4.

FIG. 7 is a fragmentary sectional side view of the cutting tool according to the present invention seen along lines 7—7 in FIG. 5.

FIG. 8 is a sectional end view of the cutting tool according to the present invention seen along lines 8—8 in FIG. 7.

FIG. 9 is a fragmentary sectional side view of the cutting tool according to the present invention seen along lines 9—9 in FIG. 6.

FIG. 10 is a fragmentary side view of the cutting tool according to the present invention seen along lines 10—10 in FIG. 7.

DETAILED DESCRIPTION OF THE PREFERRED EMBODIMENT

Figure 2:
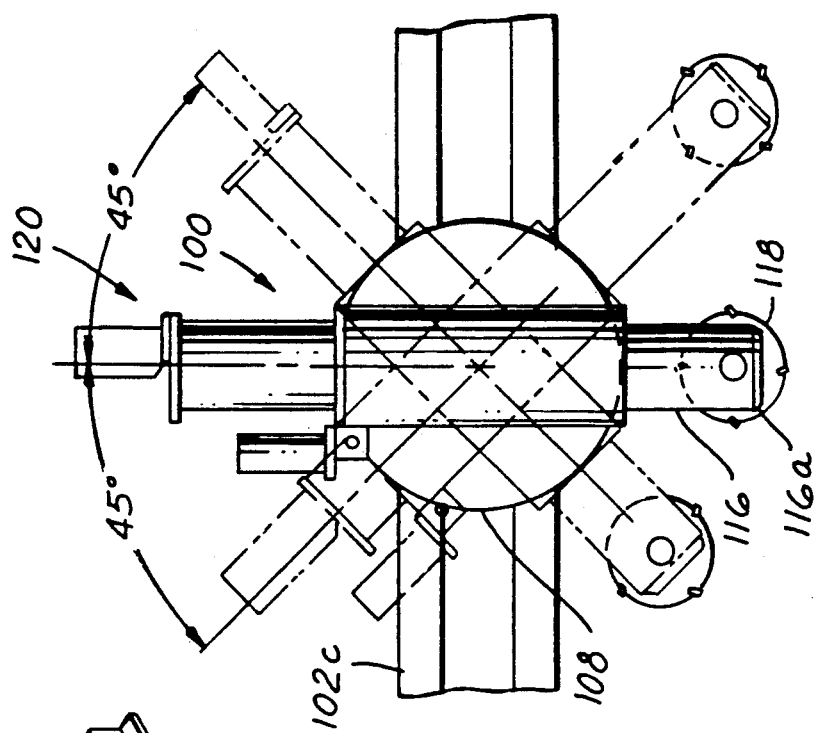
FIG. 2 is a perspective view of the cutting tool according to the present invention mounted on a milling machine, shown in operation cutting a three dimensional contour on a workpiece.

Referring now to the Drawing, FIG. 2 shows the cutting tool 100 according to the present invention in operation mounted to a milling machine 102 and cutting a complex three dimensional contour 104 on a workpiece 106. The milling machine 102 includes a base 102a, columns 102b, a spindle head holder 102c vertically movable along axis Y by a drive (not shown) with respect to the columns, and a workholder 102d horizontally movable along axis Z by a drive (not shown) with respect to the base. The cutting tool 100 is mounted to the spindle head holder 102c and is horizontally movable with respect thereto along axis X by a drive (not shown) via a guideway 102e. Thus, the milling machine 102 provides three degrees of freedom of movement of the cutting tool 100 relative to the workpiece 106.

Figure 3:
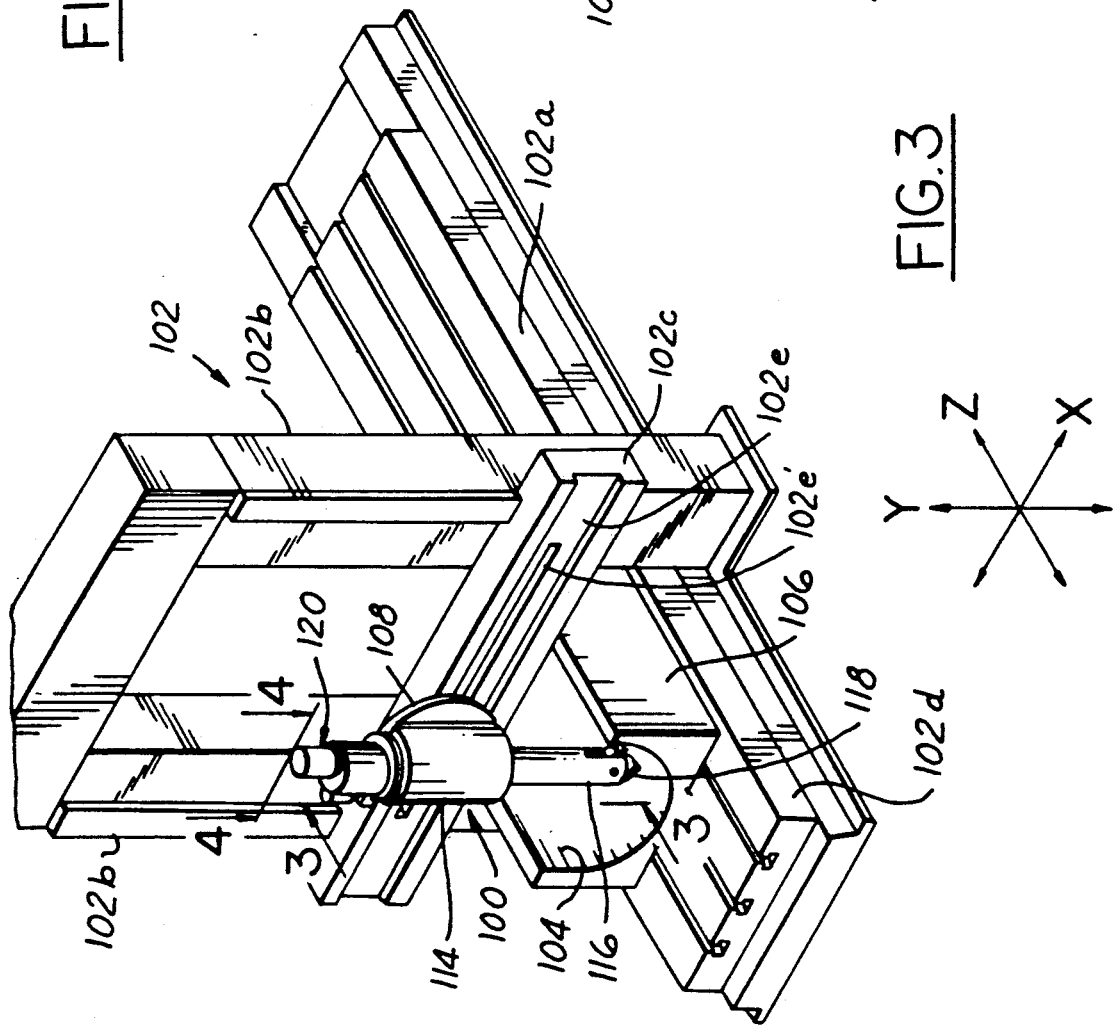
FIG. 3 is a side view of the cutting tool according to the present invention seen along lines 3—3 in FIG. 2, showing possible orientations of the cutting tool.

As exemplified by FIGS. 3 and 6, the cutting tool 100 is mounted relative to the guideway 102e of the spindle head holder 102c by means of a circularly shaped swivel plate 108, a swivel plate block 110 and swivel plate mounting bolt 112 which extends through a slot 102e' in the guideway 102e. Further, the cutting tool 100 has an additional degree of freedom of movement in that the cutting tool may rotate 90 degrees about the swivel plate mounting bolt 112 (45 degrees either side of the vertical Y axis). Rotation of the cutting tool is controlled by a drive (not shown).

FIGS. 2 and 3 further show that the cutting tool 100 includes a sleeve 114 connected with the swivel plate 108. The sleeve receives a quill 116 which is axially slidable within the sleeve. At the forward end 116a of the quill 116 is located a side cutter 118 for performing a machining operation on the workpiece 106. At the rear end 116b of the quill is located a spindle drive for driving the side cutter. The spindle drive may be part of the cutting tool, as shown by spindle drive 120, or may alternatively be the spindle drive of the milling machine.

Figure 12:
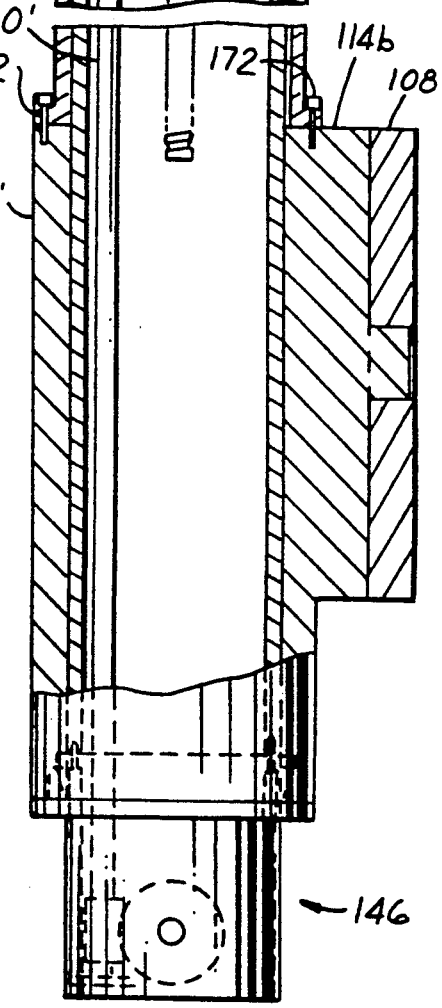
FIG. 12 is a partly sectional side view of the cutting tool having a precision ball screw positioning device.

Referring now to FIGS. 4 through 12, the construction and functioning of the cutting tool 100 will be detailed. In this regard, FIGS. 4 through 11 depict a preferred embodiment of the invention, while FIG. 12 depicts an improved variation thereof for providing highest precision control of positional movement of the quill relative to the sleeve.

Referring firstly to the embodiment of the cutter tool 10 depicted in FIGS. 4 through 12, the sleeve 114 is connected to the swivel plate 108 via bolts 122. The quill 116 is slidably received within the sleeve; lubrication therebetween is provided by oil introduced under air pressure in a manner well known in the art. A locator ring 126 is connected to the rear end 114b of the sleeve 114. The locator ring 126 serves as stop guidance for travel of the quill 116 in relation to the sleeve 114. The quill 116 is slidably regulated by a position motor 128 connected with the locator ring 126 via a rack 130 connected to the quill and a pinion 132 connected with the position motor. Selective actuation of the position motor causes the quill to slide selectively within the sleeve, and thereby selectively move with respect to the swivel plate 108 and the milling machine 102. The quill 116 is prevented from rotationally moving with respect to the sleeve 114 by guidance in the form of a pair of complementarily engaging keys 134a and key-slots 134b, one set being located on opposite sides of the quill and sleeve.

A cap plate 136 is connected to the rear end 116b of the quill 116. The cap plate 136 supports the spindle drive 120. The spindle drive 120 is composed of a cutter drive motor 138 mounted to the cap plate 136. A drive shaft 140 is connected with the cutter drive motor and extends axially within the quill toward the forward end 116a thereof. A splined drive shaft coupling 142 connects the forward end 140a of the drive shaft 140 to a cutter head drive shaft 142. Alternatively, the drive shaft 140 may be integral with the cutter head drive shaft 142, thereby obviating the coupling 142 as shown in FIG. 12 (the drive shaft 140 being structured for a splined engagement with the cutter drive motor 138).

At the forward end 116a of the quill 116 a cutter head 146 is connected thereto. The cutter head 146 has a cutter head body 146' which is removably connected to the quill in a manner well known in the art, such as by countersunk bolts 148. The cutter head body 146' has a slotted forward end 150, the slot 151 being oriented parallel with respect to the cylindrical axis of quill 116. A cutter shaft 152 extends across the two portions 150a and 150b of the forward end 150 of the cutter head body 146' formed on either side of the slot 151. A first portion 152a of the cutter shaft 152 has a splined segment 152b, while an adjacent second portion 152c thereof is of a narrower cross-section than the first portion and includes a splined portion 152d. The cutter shaft is supported by bearings 154a and 154b, and is held positionally by end caps 156a and 156b, which are, in turn, held by the bolts 148. The cutter head drive shaft 144 is supported by bearings 155 and carries a worm 158. A worm gear 160 connected with the splined segment 152d of the second portion 152c of the cutter shaft 152 meshes with the worm 158. The side cutter 118 is mounted to the cutter shaft 152, is located between the two portions 150a, 150b of the cutter head and is splined so as to engage the splined segment 152b of the first portion 152a of the cutter shaft. The side cutter 118 is of circular cross-section and has a plurality of cutting teeth 162 on its periphery 163. The teeth 162 have particular rake, relief and cutting-edge angles as required to suit a particular machining operation.

The forward end 114a of the sleeve is provided with threads. A tapered locking nut engages the threads and abuts a tapered locking ring 166 so as to provide selective locking of the position of the cutter head in relation to the sleeve 114. This feature is of particular usefulness to position the cutter head in the event the position motor 128 is dispensed with, assuming, of course, that sufficient degrees of freedom of movement of the cutter head is achieved without it.

Referring now to FIG. 12 a version of the cutting tool 100 provided with a highly precise axially slidable movement function will now be elaborated.

A slightly modified sleeve 114' has connected at its rear end 114b an extension sleeve segment 170 via bolts 172. The extension sleeve segment terminates at an end plate 174 which is connected thereto. A position motor 128' connected with the end plate 174 has a driver sheave 176 which drives a driven sheave 178 via a belt 180. The driven sheave is connected with a ball screw 182, which is, in turn, connected to the end plate 174 by a ball screw retainer ring 183. The ball screw threadably and ball bearingly engages a ball screw nut 184 connected with a modified cap plate 136' which is, in turn, connected with the quill 116. The cutter head 146 is connected to the forward end of the quill as described hereinabove. It is preferred that the drive shaft 140' be of unitary construction (the cutter head drive shaft merely denoting the forward end portion of the drive shaft). Either the cutter drive motor 138 or the spindle drive of the milling machine is connected to the distal end 143 of the drive shaft 140'. A drive motor torque tube 141 is connected with the cap plate 136' for connection of the cutter drive motor 138 at its end 141'. As the position motor 128' is selectively actuated, the ball screw 182 will rotate and threadably interact with the cap plate 136' causing the quill 116 to axially move with respect to the sleeve 114'. Movement of the quill with respect to the sleeve is regulated by complementary engagement between a keyway 186 located on the inside of the position motor torque tube 170 and a key 188 located on the cap plate 136'.

Operation of the cutter tool 100 will now be described with reference now being additionally to FIG. 13.

The spindle drive (the cutter drive motor or spindle drive of the milling machine) is actuated, thereby turning the drive shaft at a predetermined speed. In turn, the drive shaft rotates the cutter head drive shaft, the worm, the worm gear, the cutter shaft and the side cutter. Based upon a CNC program, the aforesaid four degrees of freedom of movement of the cutting tool are selectively utilized as necessary to bring the teeth of the side cutter into contact with the workpiece in order to shape the predetermined contour thereon. Movement by CNC control includes actuation of the position motor wherein the quill slides with respect to the sleeve.

Figure 1:
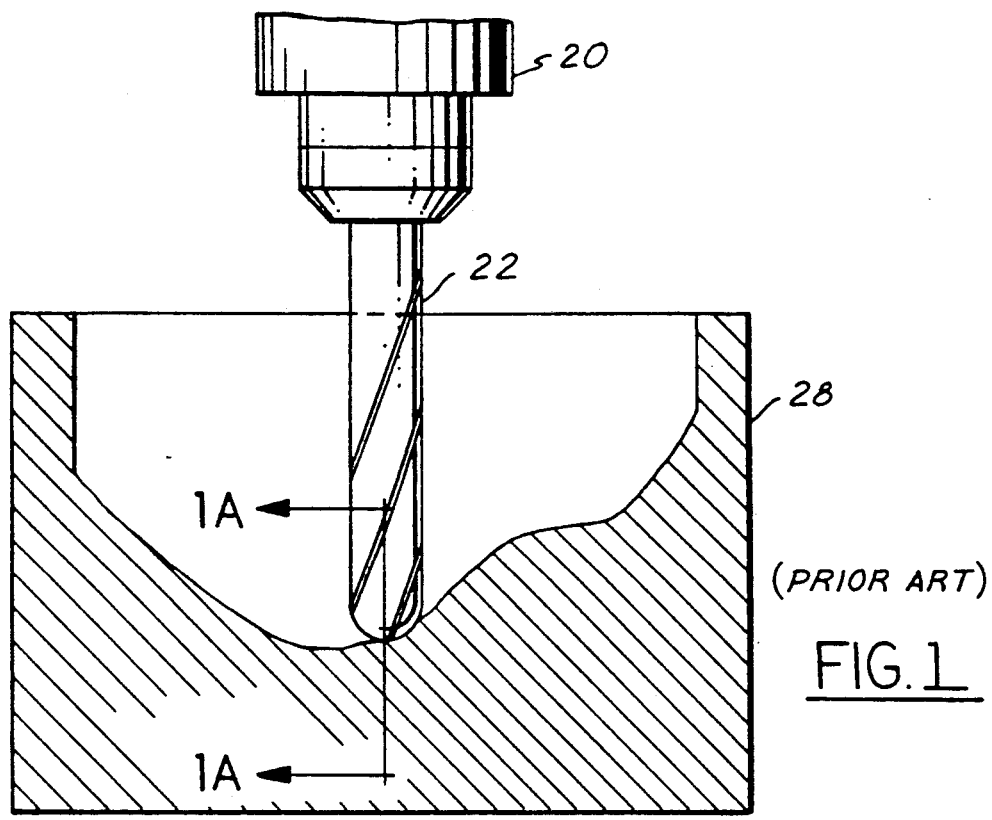
FIG. 1 is a partly fragmentary side view of a conventional milling machine with an associated end mill cutter in the process of providing a three dimensional contour on a workpiece by cutting a series of groove cuts in the workpiece.
Figure 1A:
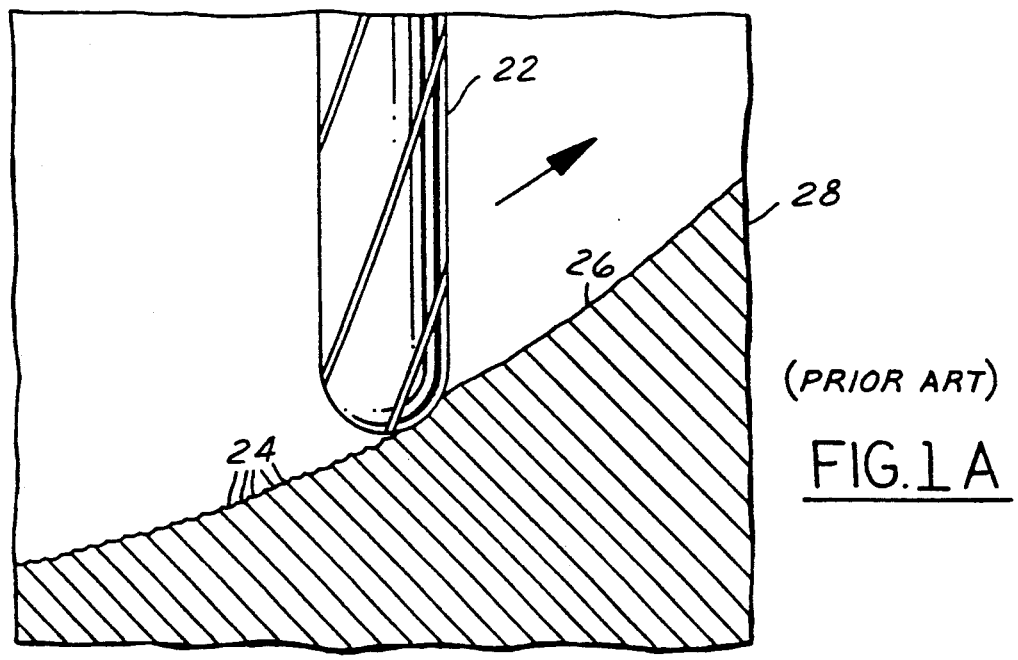
FIG. 1A is a detail view of the conventional cutting process as seen along lines 1A—1A in FIG. 1.
Figure 13:
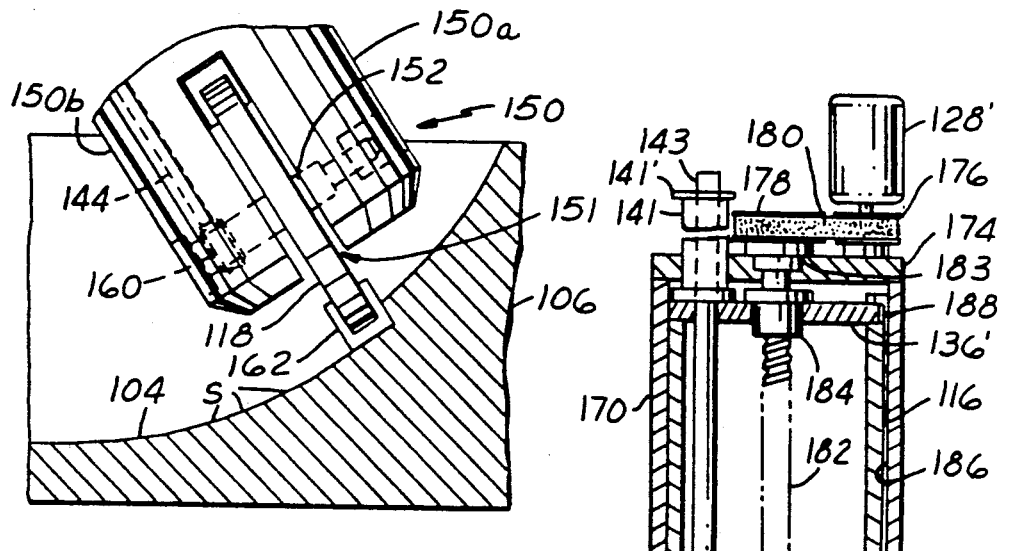
FIG. 13 is a partly sectional side view of the cutter according to the present invention, shown in operation performing three dimensional contour cutting of a workpiece.
Figure 11:
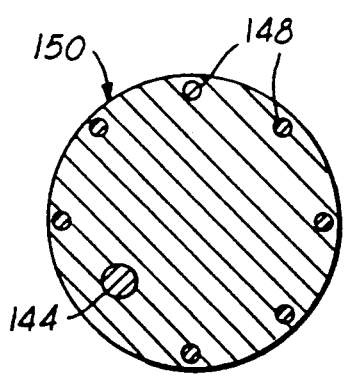
FIG. 11 is a cross-sectional end view of the cutting tool according to the present invention seen along lines 11—11 in FIG. 9.

As can be discerned from FIG. 13, complex three dimensional contours may be cut into the surface of the workpiece by a progressive series of swaths S. Each swath is much larger than the very narrow groove cuts produced by the prior art system, shown in FIGS. 1 and 1A, using an end mill. Also, each swath meets adjacent swaths much more smoothly than the groove cuts of the prior art, so that finish machining of the contour is minimal. Still further, because the teeth of the side cutter engage the workpiece in the direction of cut of the swath, rather than laterally as in the case of the prior art, cutting time is much reduced, thereby lowering cost and increasing profitability.

To those skilled in the art to which this invention appertains, the above described preferred embodiment may be subject to change or modification. For instance, as indicated hereinabove, the drive shaft may be actuated by a spindle drive associated with the milling machine rather than by one associated with the cutting tool itself. In this regard, a spindle of the spindle drive would rotate the drive shaft. Further in this regard, the milling machine may further include a quill to which is attached the cutter head body of the cutter head 146 of the present invention. Such change or modification can be carried out without departing from the scope of the invention, which is intended to be limited only by the scope of the appended claims.

What is claimed is:

1. A cutting tool for a milling machine, said cutting tool comprising:

a sleeve structured for being connected with the milling machine, said sleeve having a forward end and a rear end;

a quill axially received in said sleeve, said quill having a forward end and a rear end, said quill having a cylindrical axis, said sleeve and said quill being structured so that said quill is slidable with respect to said sleeve;

guidance means for preventing rotational movement of said quill with respect to said sleeve;

cutter drive means connected with said rear end of said quill for providing a source of rotational movement;

a drive shaft connected with said cutter drive means, said drive shaft being rotated by said cutter drive means, said drive shaft extending toward said forward end of said quill, said drive shaft being in parallel alignment with respect to the cylindrical axis of said quill;

a cutter head connected with said forward end of said quill, said cutter head comprising:

a cutter head body, said cutter head body having a rear end connected with said forward end of said quill, said cutter head body having a forward end, said forward end of said cutter head body having a slot, said slot having an orientation parallel with respect to the cylindrical axis of said quill, a first portion of said forward end of said cutter head body being located on one side of said slot, a second portion of said forward end of said cutter head body being located on the other side of said slot;

a cutter shaft rotatably mounted to each of said first and second portions of said forward end of said cutter head body, said cutter shaft being oriented transversely with respect to said slot and said drive shaft;

a side cutter connected with said cutter shaft, said side cutter rotating with said cutter shaft in said slot, said side cutter having a periphery extending beyond said forward end of said cutter head body, said side cutter being provided with a plurality of teeth on said periphery thereof; and cutter shaft drive shaft gearing means for drivably connecting said cutter shaft to said drive shaft.

2. The cutter tool of claim 1, further comprising swivel plate means connected with said sleeve for connecting said sleeve to the milling machine and for permitting selective orientation of said sleeve with respect to the milling machine.

3. The cutter tool of claim 1, further comprising position motor means for selectively axially moving said quill with respect to said sleeve.

4. The cutter tool of claim 3, further comprising swivel plate means connected with said sleeve for connecting said sleeve to the milling machine and for permitting selective orientation of said sleeve with respect to the milling machine.

5. The cutter tool of claim 3, wherein said position motor means comprises:
 a position motor connected with said sleeve, said position motor having a pinion gear; and
 a rack connected with said quill, said rack gearably engaging said pinion gear.

6. The cutter tool of claim 3, wherein said position motor means comprises:
 a sleeve extension segment having a forward end and a rear end, said forward end of said sleeve extension segment being connected with said rear end of said sleeve;
 a position motor connected with said rear end of said sleeve extension segment;
 a ball screw nut connected with said rear end of said quill;
 a ball screw rotatably connected with said rear end of said sleeve extension segment, said ball screw threadably engaging said ball screw nut; and
 movement transfer means for transferring rotation of said position motor to rotation of said ball screw.

7. The cutter tool of claim 6, further comprising a drive motor torque tube connected with said rear end of said quill for connection thereto of said cutter drive means.

8. The cutter tool of claim 3, wherein said forward end of said sleeve is internally threaded; said cutting tool further comprising quill locking means for selectively locking slidable movement of said quill with respect to said sleeve, said quill locking means comprising:

a tapered locking nut threadably engaging the threads of said forward end of said sleeve; and a tapered locking ring located between said tapered locking nut and said quill, said tapered locking ring being structured to cooperate with said tapered locking nut so as to apply a locking force on said quill to prevent slidable movement of said quill with respect to said sleeve when said tapered locking nut is selectively threaded a predetermined amount on the threads of said forward end of said sleeve.

9. A cutting tool for a milling machine, the milling machine having a spindle drive, said cutting tool comprising:

a sleeve structured for being connected with the milling machine, said sleeve having a forward end and a rear end;

a quill axially received in said sleeve, said quill having a forward end and a rear end, said quill having a cylindrical axis, said sleeve and said quill being structured so that said quill is slidable with respect to said sleeve;

guidance means for preventing rotational movement of said quill with respect to said sleeve;

cutter drive means connected with said rear end of said quill for providing a source of rotational movement by connection with the spindle drive of the milling machine;

a drive shaft connected with said cutter drive means, said drive shaft being rotated by said cutter drive means, said drive shaft extending toward said forward end of said quill, said drive shaft being in parallel alignment with respect to the cylindrical axis of said quill;

a cutter head connected with said forward end of said quill, said cutter head comprising:
 a cutter head body, said cutter head body having a rear end connected with said forward end of said quill, said cutter head body having a forward end, said forward end of said cutter head body having a slot, said slot having an orientation parallel with respect to the cylindrical axis of said quill, a first portion of said forward end of said cutter head body being located on one side of said slot, a second portion of said forward end of said cutter head body being located on the other side of said slot;
 a cutter shaft rotatably mounted to each of said first and second portions of said forward end of said cutter head body, said cutter shaft being oriented transversely with respect to said slot and said drive shaft;
 a side cutter connected with said cutter shaft, said side cutter rotating with said cutter shaft in said slot, said side cutter having a periphery extending beyond said forward end of said cutter head body, said side cutter being provided with a plurality of teeth on said periphery thereof; and
 cutter shaft drive shaft gearing means for drivably connecting said cutter shaft to said drive shaft.

10. The cutter tool of claim 9, further comprising swivel plate means connected with said sleeve for connecting said sleeve to the milling machine and for permitting selective orientation of said sleeve with respect to the milling machine.

11. The cutter tool of claim 9, further comprising position motor means for selectively axially moving said quill with respect to said sleeve.

12. The cutter tool of claim 11, further comprising swivel plate means connected with said sleeve for connecting said sleeve to the milling machine and for permitting selective orientation of said sleeve with respect to the milling machine.

13. The cutter tool of claim 11, wherein said position motor means comprises:
- a position motor connected with said sleeve, said position motor having a pinion gear; and
- a rack connected with said quill, said rack gearably engaging said pinion gear.

14. The cutter tool of claim 11, wherein said position motor means comprises:
- a sleeve extension segment having a forward end and a rear end, said forward end of said sleeve extension segment being connected with said rear end of said sleeve;
- a position motor connected with said rear end of said sleeve extension segment;
- a ball screw nut connected with said rear end of said quill;
- a ball screw rotatably connected with said rear end of said sleeve extension segment, said ball screw threadably engaging said ball screw nut; and
- movement transfer means for transferring rotation of said position motor to rotation of said ball screw.

15. The cutter tool of claim 11, wherein said forward end of said sleeve is internally threaded; said cutting tool further comprising quill locking means for selectively locking slidable movement of said quill with respect to said sleeve, said quill locking means comprising:
- a tapered locking nut threadably engaging the threads of said forward end of said sleeve; and
- a tapered locking ring located between said tapered locking nut and said quill, said tapered locking ring being structured to cooperate with said tapered locking nut so as to apply a locking force on said quill to prevent slidable movement of said quill with respect to said sleeve when said tapered locking nut is selectively threaded a predetermined amount on the threads of said forward end of said sleeve.

16. A cutter head for being connected with a forward end of a quill of a milling machine, the quill having a cylindrical axis, the milling machine including a spindle drive for rotating a connected spindle that is oriented parallel with respect to the cylindrical axis of the quill, said cutter head comprising:
- a cutter head body, said cutter head body having a rear end connected with said forward end of said quill, said cutter head body having a forward end, said forward end of said cutter head body having a slot, said slot having an orientation parallel with respect to the cylindrical axis of said quill, a first portion of said forward end of said cutter head body being located on one side of said slot, a second portion of said forward end of said cutter head body being located on the other side of said slot;
- a cutter shaft rotatably mounted to each of said first and second portions of said forward end of said cutter head body, said cutter shaft being oriented transversely with respect to said slot and said cylindrical axis of said quill;
- a side cutter connected with said cutter shaft, said side cutter rotating with said cutter shaft in said slot, said side cutter having a periphery extending beyond said forward end of said cutter head body, said side cutter being provided with a plurality of teeth on said periphery thereof; and
- cutter shaft drive shaft gearing means for drivably connecting said cutter shaft to the spindle connected with the spindle drive of the milling machine.

* * * * *